Oct. 16, 1951  E. HOFFMAN  2,571,135
DISCHARGE CONVEYER MECHANISM FOR ARTICLES
Filed May 14, 1947  3 Sheets-Sheet 1

INVENTOR
Ernest Hoffman
BY
ATTORNEYS

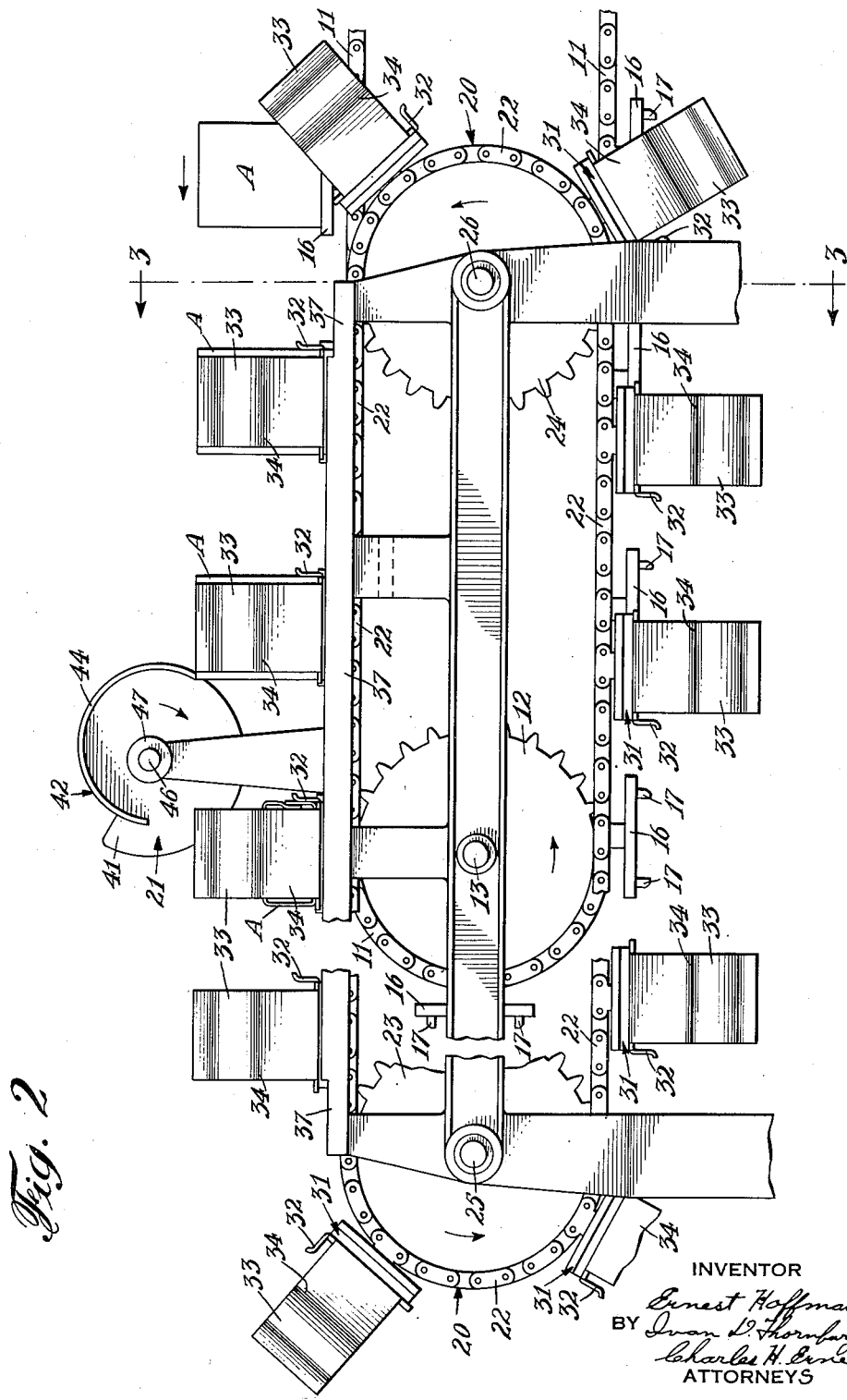

Oct. 16, 1951        E. HOFFMAN        2,571,135
DISCHARGE CONVEYER MECHANISM FOR ARTICLES
Filed May 14, 1947        3 Sheets-Sheet 3
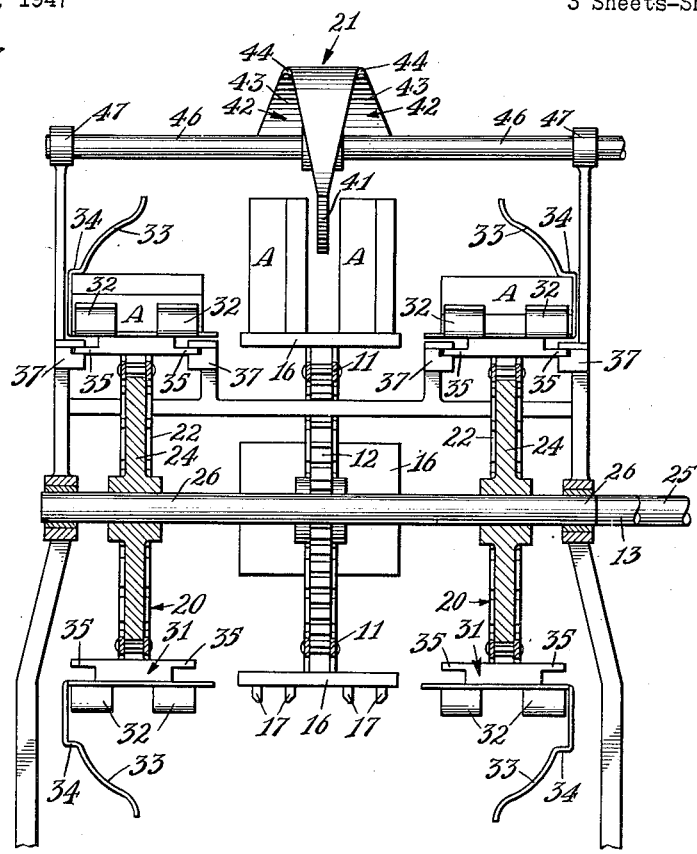
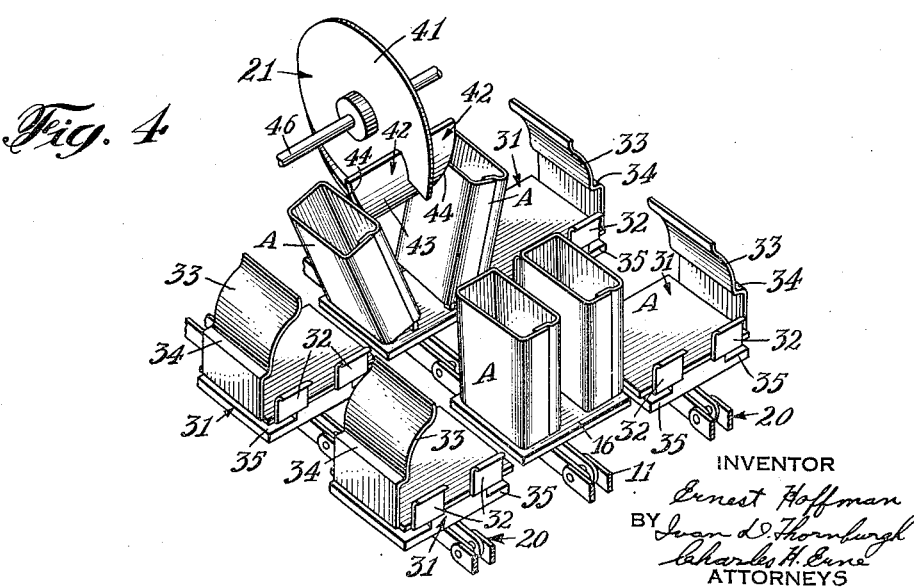

Patented Oct. 16, 1951

2,571,135

UNITED STATES PATENT OFFICE 2,571,135

DISCHARGE CONVEYER MECHANISM FOR ARTICLES

Ernest Hoffman, Nutley, N. J., assignor to American Can Company, New York, N. Y., a corporation of New Jersey Application May 14, 1947, Serial No. 748,100

5 Claims. (Cl. 198—33)

The present invention relates to a discharge conveyor mechanism for articles such as container bodies or the like and has particular reference to movable devices for shifting the articles from one position into another position to facilitate discharge of the articles to a suitable place of deposit.

An object of the invention is the provision in a discharge conveyor mechanism of movable devices wherein the devices have a rotary movement and act against the articles for shifting them into an advantageous position prior to discharge to facilitate the discharge of such articles traveling in a continuous procession.

Another object is the provision of such discharge devices wherein the articles to be discharged are acted upon gently and smoothly while turning them from one position into another so that the articles may be discharged at high rates of speed without in any way marring or damaging the articles during the discharging operation.

Another object is the provision of such discharge devices wherein articles traveling in a continuous procession in a double file or lane may be rapidly and effectively separated into two separate single lane processions for discharge to separate subsequent operation machines or other suitable place of deposit.

Another object is the provision of such discharge devices wherein articles traveling in an upright or vertical position may be readily turned into a horizontal position while traveling at high rates of speed to facilitate discharge of the articles to a suitable place of deposit.

Numerous other objects and advantages of the invention will be apparent as it is better understood from the following description, which, taken in connection with the accompanying drawings, discloses a preferred embodiment thereof.

Referring to the drawings:

Fig. 2 is a side elevation of the mechanism and the container bodies shown in Fig. 1, with parts broken away;

Fig. 3 is a sectional view taken substantially along the line 3—3 in Fig. 2, with parts broken away; and Fig. 4 is a schematic perspective view showing how the container bodies are turned over.

Figure 1:
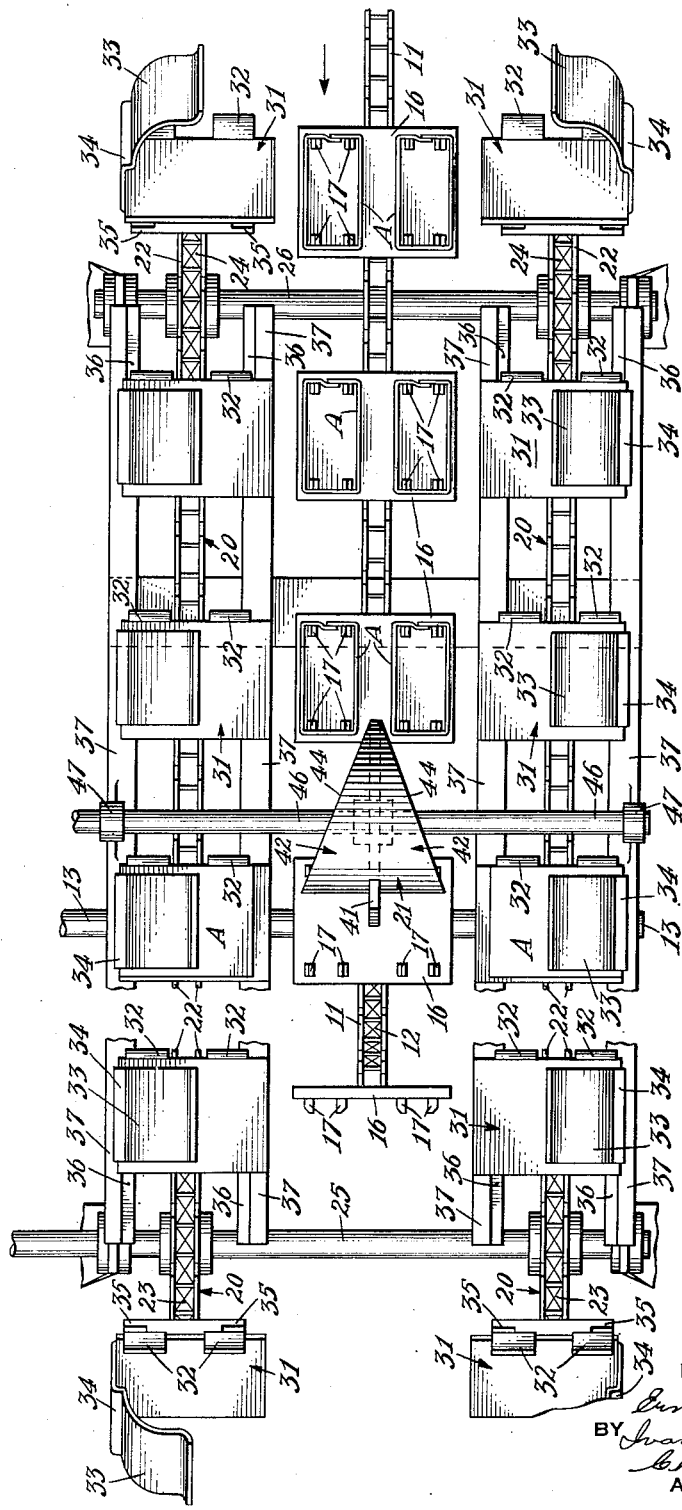
Figure 1 is a top plan view of a conveyor mechanism having container bodies in place thereon and embodying the instant invention, with parts broken away.

As a preferred embodiment of the instant invention the drawings illustrate a discharge conveyor mechanism for turning container bodies A (Figs. 1 and 2), moving in double file continuous processions from a vertical position into a horizontal position and for carrying them in the horizontal position in a single file to any suitable place of deposit. The container bodies A, shown in the drawings as an exemplary embodiment, are of the rectangular-shaped fibre material type which may be used for frozen foods and other products.

The container bodies A to be discharged as an incident to the body forming operations or other prior treatment, are disposed in a vertical on-end or upright position and are arranged in a double row or lane continuous procession moving along a predetermined path of travel on a feed conveyor 11 (Figs. 1 and 2) which may form a part of a more elaborate machine for performing operations on the bodies carried therethrough. The conveyor 11 shown in the drawings is of the endless chain type disposed in a horizontal position and operates over a sprocket 12 (see also Fig. 3) mounted on a drive shaft 13 journaled in suitable bearings formed in a frame which may constitute the main frame of the machine. The drive shaft may be rotated in any suitable manner.

The advancing container bodies A are supported on cradles 16 secured to the conveyor 11 at spaced intervals. Each cradle preferably supports two container bodies disposed in side-by-side or parallel or double file relationship. Retainer lugs 17 projecting up from the cradles 16 extend up into the bodies and hold them in a predetermined location while traveling with the conveyor. There are four of these retainer lugs for each body and they are located so as to engage the body adjacent its four corners.

The conveyor 11 carries the upright bodies into a discharge mechanism which includes a pair of discharge conveyors 20 and a turnover device 21. The discharge conveyors 20 are located in spaced and parallel relation with each other and with the feeding conveyor 11 and are disposed one on each side of the body feeding run of the feed conveyor 11 as best shown in Figs. 1 and 3.

The discharge conveyors 20 respectively comprise continuously operating endless chains 22 which operate over vertical driving sprockets 23 and idler sprockets 24 mounted respectively on a drive shaft 25 and an idler shaft 26, journaled in suitable bearings formed in the main frame of the machine. The driving shaft 25 is rotated in any suitable manner in time with the feed conveyor 11 and thus operates the discharge conveyors at the same lineal speed as that of the feed conveyor.

Each of the discharge conveyors 20 is provided with container body carriers 31 (see also Fig. 4) which are secured to the conveyor chains 22 at spaced intervals, which spacing preferably corresponds to the spacing of the cradles 16 on the feed conveyor 11. The body carriers 31 are formed with rear body locating lugs 32 which extend up from the top of the carriers and a curved side wall section 33 having an off set retaining ledge 34.

The two longitudinal edges of the carriers 31 are formed with tongues 35 which enter into and slide along grooves 36 in side guides 37, when the carriers travel along the upper runs of the discharge conveyors. The guides 37 are secured to the main frame of the machine and extend along the full length of the upper runs of the conveyors and support the carriers against sagging. The carriers are thus maintained in a horizontal plane while traveling along the upper runs of the conveyors.

The turnover device 21 includes a rotary turnover element which comprises a vertically disposed flat disc 41 having a pair of laterally extending vanes 42 secured thereto and located one on each side of the disc in alignment with each other. The vanes preferably have a spiral shaped outer face 43 and a tapered and curved outer edge 44 which merges into the outer periphery of the disc. The two vanes taken together form a V-shaped curved wedge.

The turnover disc or element 41 is located above and at the longitudinal center of the feed conveyor 11 and is mounted on a transverse shaft 46 journaled in a pair of spaced bearing brackets 47 bolted to the main frame. The shaft is continuously rotated in any suitable manner in time with the travel of the container bodies on the feeding conveyor 11, the shaft and the disc 41 carried thereon making one revolution for each pair of bodies on the conveyor.

Hence as the double lane of the bodies on the feeding conveyor 11 approaches the discharge mechanism, they pass one on each side of the turnover disc 41 and are engaged by the outer tapered edges of the vanes 42 as the vanes rotate with the disc as best shown in Fig. 4. The vanes acting as a wedge between the two bodies forces them outwardly in a direction away from each other and toward the discharge conveyors 20.

This outward deflection of the bodies pivots or hinges them on the outer retainer lugs 17 of the cradles 16 and thus starts them falling through an arc from their vertical position into a horizontal position toward the discharge conveyors 20. Of the two bodies on each cradle 16, one falls toward one discharge conveyor and the other falls toward the opposite discharge conveyor.

The falling bodies are received in the body carriers 31 on the discharge conveyors 20, the upper edges of the bodies passing down along the curved end guide or wall section 33 of the carriers into a horizontal position under the retaining ledge 34. The bodies in this position are carried in spaced and timed order by the discharge conveyors to any suitable place of deposit while the retaining ledge 34 and the rear lugs 32 of the carriers hold the bodies in place.

Thus the double lane of vertically disposed bodies A traveling on the feed conveyor 11, is divided into two separate single lanes or files or rows of bodies disposed in a horizontal position for discharge to separate subsequent operation machines or other suitable disposal.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a discharge conveyor mechanism for articles such as container bodies and the like, the combination of feeding means for advancing container bodies in an upright position, discharge means disposed adjacent said feeding means for receiving said container bodies on their sides from said feeding means, and an axially fixed rotatable member disposed in the path of travel of the bodies on said feeding means, said rotatable member having a peripherally curved laterally inclined side wall portion for engaging against the sides of successive container bodies being advanced by said feeding means for laterally tilting said bodies onto their side surfaces and in such position onto said discharge means.

2. In a discharge conveyor mechanism for articles such as container bodies and the like, the combination of feeding means for advancing container bodies in spaced upright position, an axially fixed rotatable deflector member having oppositely tapered circumferential edges disposed in the path of travel of the bodies and engageable between and against the advancing bodies for laterally displacing them from the feeding means and for turning them upon their sides, and discharge means disposed adjacent said feeding means for receiving the thus displaced and turned bodies and for discharging them to a place of deposit.

3. In a discharge conveyor mechanism for articles such as container bodies and the like, the combination of a feed conveyor for advancing two adjacent bodies in spaced relation and corresponding position along a path of travel, an axially fixed wedge shaped vane having peripherally curved and oppositely tapered deflecting edges rotatable in the path of travel of said bodies and engageable against and between said advancing bodies for moving the bodies in opposite directions from said feed conveyor and for turning said bodies into different corresponding positions, and a pair of discharge conveyors disposed on opposite sides of said feed conveyor for respectively receiving the thus displaced bodies and for moving them to a place of deposit.

4. In a discharge conveyor mechanism for articles such as container bodies and the like, the combination of a feed conveyor for advancing container bodies in multiple file in an upright position along a path of travel, an axially fixed rotatable disc disposed in the path of travel of said multiple file of bodies and engageable by said advancing bodies for moving them in opposite lateral directions from said feed conveyor and for tilting the bodies into a different corresponding position, and a discharge conveyor disposed adjacent said feeding means for receiving the thus displaced bodies and for advancing them to a place of deposit.

5. In a discharge conveyor mechanism for articles such as container bodies and the like, the combination of a feeding conveyor having spaced cradles thereon for carrying and advancing pairs of vertically disposed bodies in a continuous procession in spaced and timed order, a pair of discharge conveyors located one on each side of said feeding conveyor and operable in time therewith, a plurality of carriers mounted on said discharge conveyors in a spaced relation corresponding to said cradles on the feeding conveyor, a disc located in line with the space between the bodies of each pair advancing with said feeding conveyor, said disc being rotatable in time with the advancing pairs of bodies, a pair of spiral faced vanes carried by said disc and located one on each side thereof and having curved tapered edges forming a wedge shaped member engageable with and between bodies of each pair for forcing them outwardly away from each other for removing the bodies from said feeding conveyor and for turning them simultaneously from their vertical position into a horizontal position and for depositing them onto the carriers of said discharge conveyors, and means on said carriers for guiding the turning bodies into place on said carriers and for holding them in a horizontal position on said carriers.

ERNEST HOFFMAN.

REFERENCES CITED

The following references are of record in the file of this patent:

UNITED STATES PATENTS

| Number | Name | Date |
| --- | --- | --- |
| 1,636,235 | Knowles | July 19, 1927 |
| 1,860,718 | Mott | May 31, 1932 |
| 2,115,255 | David et al. | Apr. 26, 1938 |
| 2,439,657 | Hexter et al. | Apr. 13, 1948 |